(12) United States Patent
Smith et al.

(10) Patent No.: US 7,597,026 B2
(45) Date of Patent: Oct. 6, 2009

(54) CABLE ASSEMBLY CONDUIT CONDENSATION DRAIN

(75) Inventors: Eric J. Smith, Clarkston, MI (US); Jeffrey L. Konchan, Romeo, MI (US); Joseph P. Fannon, Washington, MI (US); Darren M. Van Houzen, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 6 days.

(21) Appl. No.: 11/946,907

(22) Filed: Nov. 29, 2007

(65) Prior Publication Data
US 2009/0139365 A1 Jun. 4, 2009

(51) Int. Cl.
*F16C 1/10* (2006.01)
*F16C 1/20* (2006.01)

(52) U.S. Cl. ............... 74/502.6; 74/502.4; 74/501.5 R

(58) Field of Classification Search ............... 74/502.6, 74/502.4, 501.5 R; 280/14.1
See application file for complete search history.

(56) References Cited

U.S. PATENT DOCUMENTS

| | | | | |
|---|---|---|---|---|
| 4,074,945 A | * | 2/1978 | Kraus et al. | 74/502.4 |
| 4,505,040 A | * | 3/1985 | Everts | 30/296.1 |
| 5,921,143 A | * | 7/1999 | Castillo et al. | 74/502.4 |
| 6,050,619 A | | 4/2000 | Arabia, Jr. et al. | |
| 2005/0067539 A1 | * | 3/2005 | Fannon et al. | 248/65 |

OTHER PUBLICATIONS

Top slotted cable end-fitting of a cable assembly of Ficosa North America Corp., Madison Heights, MI 48071, one page product sheet dated Jun. 5, 2006.

* cited by examiner

*Primary Examiner*—Richard W L Ridley
*Assistant Examiner*—Timothy J Murphy

(57) ABSTRACT

A cable assembly having a condensation drain provided for the conduit thereof, wherein moisture is enabled to escape the conduit through a drainage opening of the condensation drain, yet the operative interaction between the cable and the conduit of the cable assembly is unaffected by the presence of the condensation drain. The condensation drain may be provided with a drip initiator which assists removal of the moisture from the conduit.

15 Claims, 3 Drawing Sheets

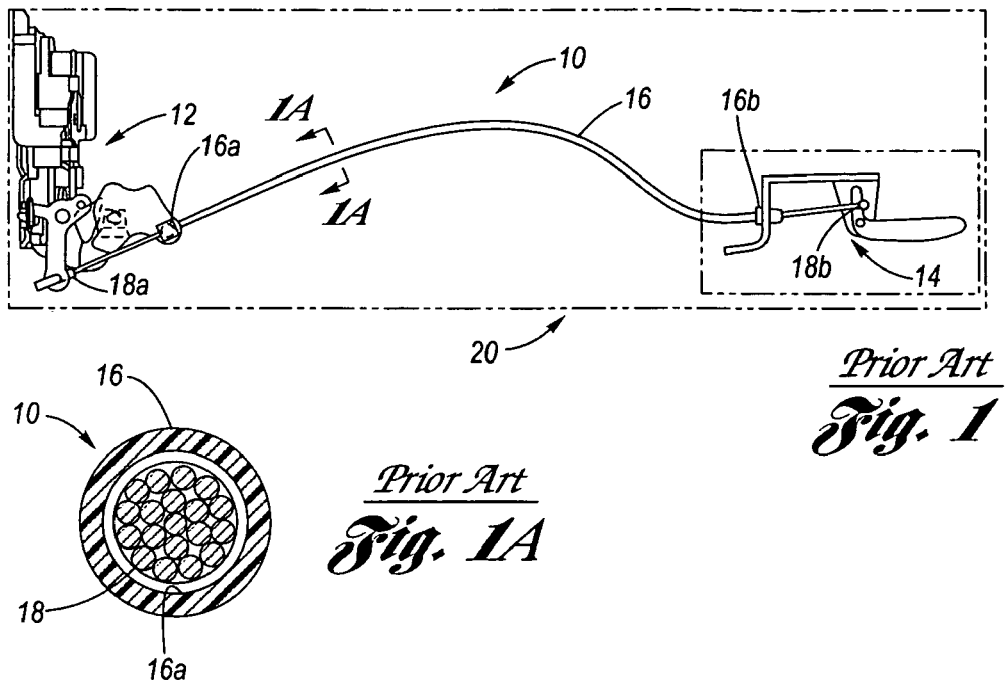
Prior Art
Fig. 1
Prior Art
Fig. 1A
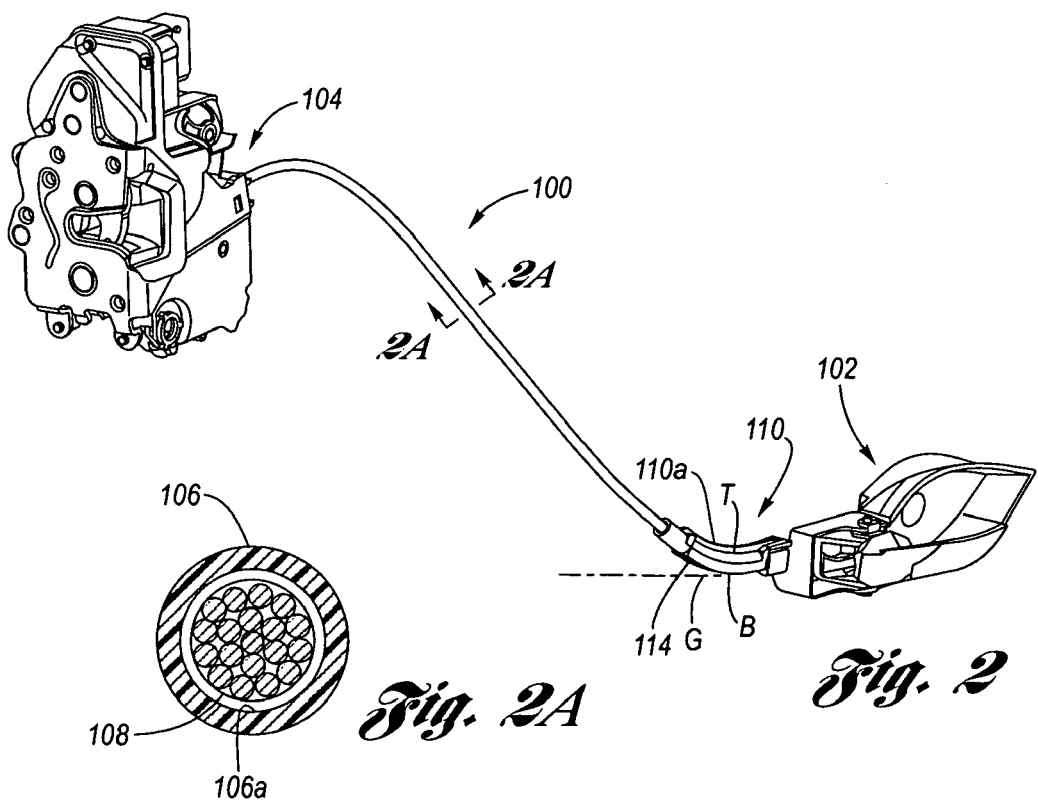
Fig. 2
Fig. 2A

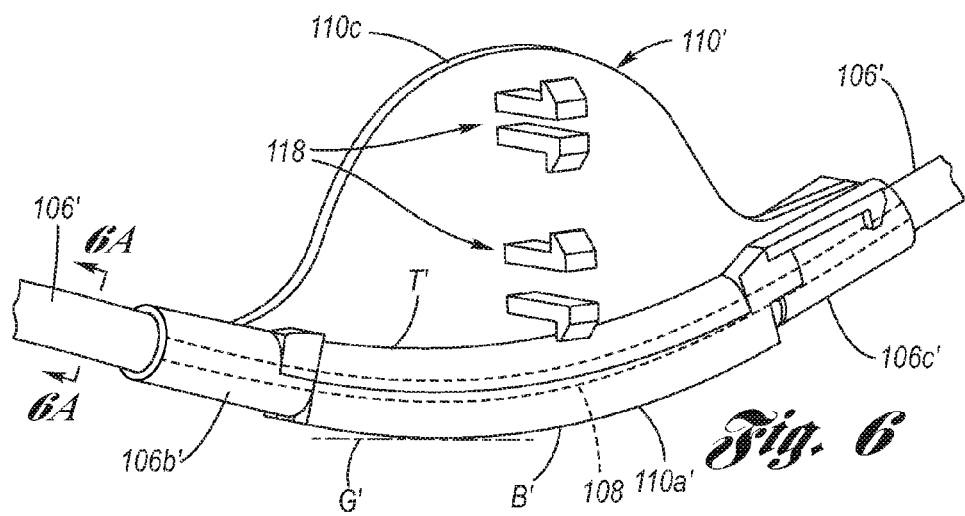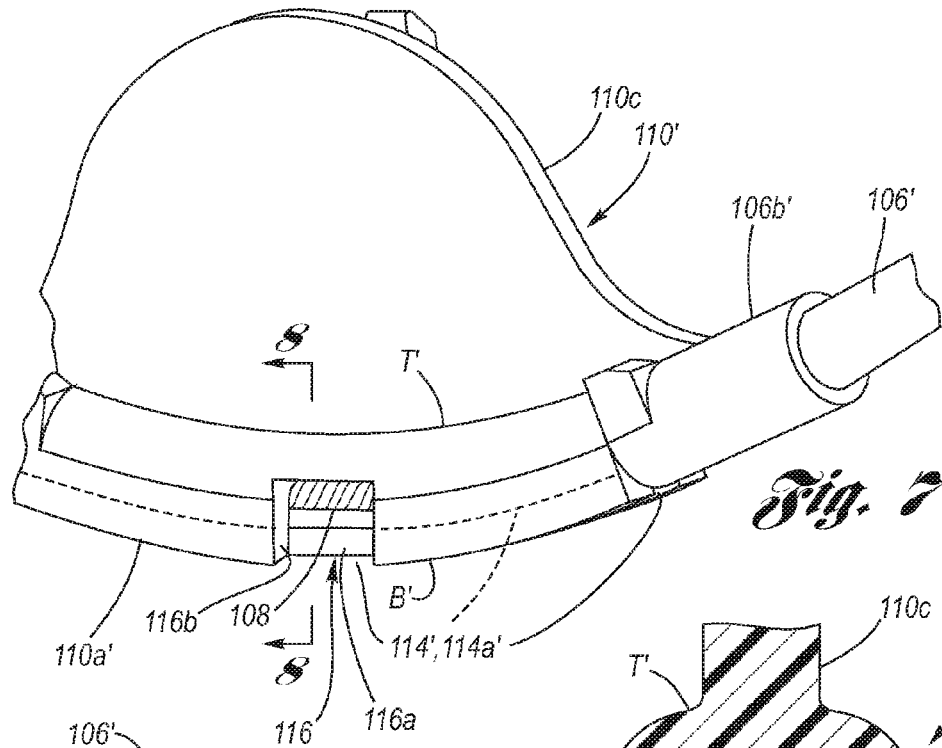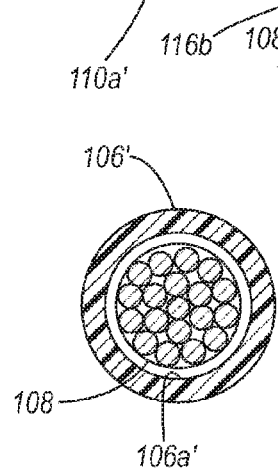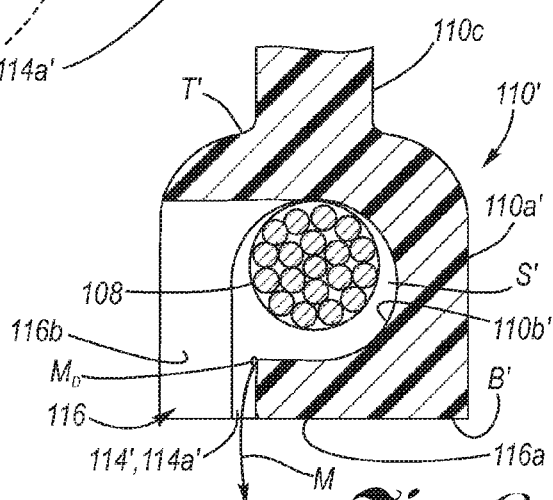

CABLE ASSEMBLY CONDUIT CONDENSATION DRAIN

TECHNICAL FIELD

The present invention relates to cable assemblies composed of a conduit and a cable slidably disposed therewithin, wherein the cable is slidable with respect to the conduit for the purpose of operably connecting mutually separated devices connected with the ends thereof. More particularly, the present invention relates to a condensation drain located at the conduit for allowing escape of moisture from within the conduit.

BACKGROUND OF THE INVENTION

Cable assemblies are generally composed of an outer conduit and an inner cable which is sheathed by the conduit. The cable is able to slide axially within the conduit such that at the ends of the cable assembly there is relative movement as between the end of the conduit and the end of the cable whereby various devices are operably linked for providing a useful result, such as for example the actuation of a lock member at one end of the cable assembly in response to movement of a handle at the other end of the cable assembly.

In the automotive arts, a cable assembly is used to mechanically connect a door handle to a latch mechanism of the door, wherein these components are separated by a distance bridged by the cable assembly. An example of such a cable assembly used in an automotive door is depicted at FIG. 1 and is described in U.S. Pat. No. 6,050,619 to Arabia, Jr., et al. issued on Apr. 18, 2000 and assigned to the assignee hereof, the disclosure of which is hereby herein incorporated by reference.

A cable assembly 10 spans between a latch mechanism 12 and a door handle 14. The cable assembly 10 is composed, as shown at FIG. 1A, of a conduit (or sheath) 16 and a cable (or core) 18, wherein the cable is axially slidable in the cable passage 16a of the conduit without binding. The conduit 16 has conduit connectors 16a, 16b at each end which interface with the latch mechanism 12 and the door handle 14, respectively; and the cable 18 has cable connectors 18a, 18b at each end which also interface with the latch mechanism and the door handle, respectively. The cable assembly 10 is such that the conduit and the cable are both capable of acting in tension and in compression. In operation, when the door handle is pulled, the cable slides in relation to the conduit which effects actuation of the latch mechanism, whereby the door 20 is unlocked and unlatched in sequence.

Problematically, moisture can accumulate, as for non-limiting example by a condensation process, within the conduit of the cable assembly, whereby the cable can be subjected to possible corrosion and the moisture may be subject to possible freezing. Therefore, it would be beneficial if somehow moisture could escape the conduit, while yet the operative interaction between the cable and the conduit is unaffected.

SUMMARY OF THE INVENTION

The present invention is a cable assembly having a condensation drain provided for the conduit, wherein moisture is enabled to escape the conduit, yet the operative interaction between the cable and the conduit is unaffected by the presence of the condensation drain.

The condensation drain is, in one form of the present invention, a condensation drain body connected to one end of the conduit, wherein the cable passes therethrough. The condensation drain body has a top and oppositely disposed bottom, wherein a drainage opening is formed in the condensation drain body at the bottom thereof. The drainage opening is sized to allow moisture exiting therethrough, whereby the drainage opening is disposed at the gravitationally lowest location of the cable assembly such that moisture in the conduit gravitationally migrates to the drainage opening where it is able to exit the conduit to the external environment. The cable operationally remains disposed within the conduit adjacent the drainage opening. In another form of the present invention, the condensation drain is located anywhere along the conduit, wherein a drainage opening is provided in the bottom of the condensation drain body, which is disposed at the gravitationally lowest location of the cable assembly.

In either form, the drainage opening may be provided with a drip initiator which facilitates thereat the formation of droplets, and wherein the drip initiator may be mechanically robust sufficient to provide an abutment to the cable as an aid to retain the cable within the conduit at the drainage opening.

Accordingly, it is an object of the present invention to provide a cable assembly having a condensation drain provided for the conduit, wherein moisture is enabled to escape the conduit, yet the operative interaction between the cable and the conduit is unaffected by the presence of the condensation drain.

This and additional objects, features and advantages of the present invention will become clearer from the following specification of a preferred embodiment.

BRIEF DESCRIPTION OF THE DRAWINGS

FIG. 1 is an elevational view of a vehicle door having a latch mechanism and door handle which are operatively connected by a prior art cable assembly.

FIG. 1A is a cross-sectional view, seen along line 1A-1A of FIG. 1.

FIG. 2 is an elevational view of a vehicle door having a latch mechanism and door handle which are operatively connected by a cable assembly, wherein the conduit of the cable assembly is equipped with a condensation drain according to a first form of the present invention.

FIG. 2A is a cross-sectional view, seen along line 2A-2A of FIG. 2.

FIG. 6 is an elevational view of a cable assembly, wherein the conduit of the cable assembly is connected with a condensation drain according to a second form of the present invention.

FIG. 6A is a cross-sectional view seen along line 6A-6A in FIG. 6.

FIG. 7 is a partly sectional, perspective view of the condensation drain of FIG. 6.

FIG. 8 is a sectional view seen along line 8-8 of FIG. 7.

DESCRIPTION OF THE PREFERRED EMBODIMENT

Figure 3:
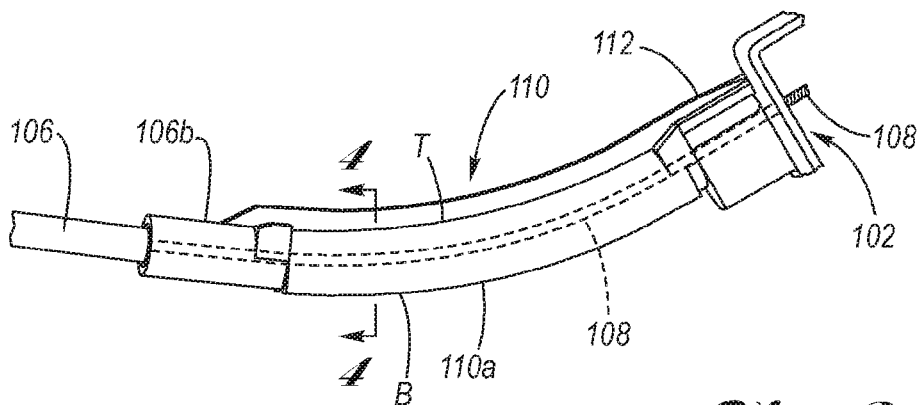
FIG. 3 is a side view of a portion of the cable assembly showing in particular the condensation drain of FIG. 2.

Referring now to the Drawing, FIGS. 2 through 8 depict various aspects of a condensation drain for a cable assembly according to the present invention.

FIG. 2 is an exemplar environment of use (wherein other environments of use are contemplated) of a cable assembly 100 according to a first form of the present invention, wherein in a car door, the cable assembly mechanically links a door handle 102 to a latch mechanism 104 generally in the manner indicated with respect to FIG. 1.

As can be discerned additionally from FIG. 2A, the cable assembly 100 includes a conduit (or sheath) 106 which receives therein a cable (or core) 108, each of which being conventional as for example described with respect to FIGS. 1 and 1A, wherein now a condensation drain 110 is connected to one end of the conduit. The condensation drain 110 has a condensation drain body 110a having a top T and an oppositely disposed bottom B, wherein a drainage opening 114 is formed in the condensation drain body at the bottom thereof.

The conduit 106 may be, for example, a cylindrically shaped, transversely flexible plastic which serves to confine and guide the cable slidably therewithin. The cable 108 may be, for example, a stranded metallic cable which is also transversely flexible which is sized to slidably move without binding in the cable passage 106a of the conduit 106. The cable assembly 100 is such that the conduit 106 and the cable 108 are both capable of acting in tension and in compression, wherein by way of example, when the door handle 102 is pulled, the cable slides in relation to the conduit which effects actuation of the latch mechanism 104, whereby the door is unlocked and unlatched in sequence. A lubricant may be provided along the cable as an aid to the sliding of the cable with respect to the conduit.

Figures 4, 4A:
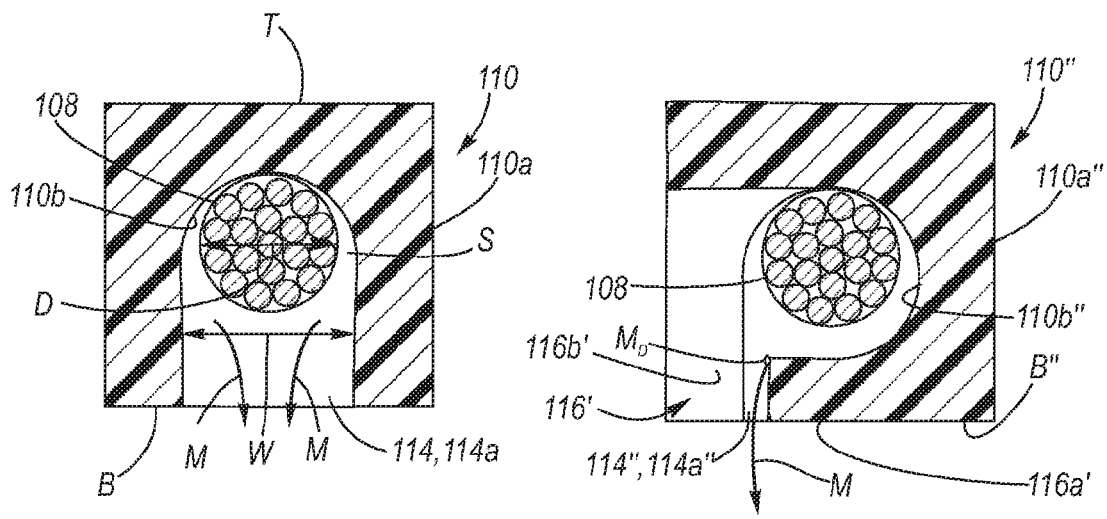
FIG. 4 is a sectional view, seen along line 4-4 in FIG. 3.
FIG. 4A is a view similar to FIG. 4, wherein now a drip initiator according to the present invention is included.
Figure 5:
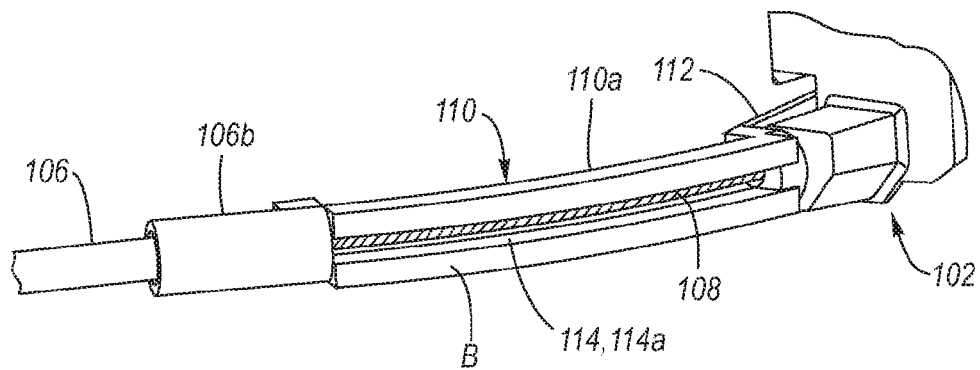
FIG. 5 is a bottom view of a portion of the cable assembly showing in particular the condensation drain of FIG. 2.

Turning attention now additionally to FIGS. 3, 4 and 5, the condensation drain 110 is interfaced with the conduit 106 at a conduit connector 106b whereat the end of the conduit is anchored to the condensation drain body 110a, as for non-limiting example by interference fit, adhesive or sonic weld. The condensation drain body 110a is affixed to the door handle 102 at a condensation drain connector 112, which may be, for example, a snap fit interface therebetween. The cable 108 extends through the condensation drain body 110a via a cable passageway 110b formed therein which communicates with the cable passage 106a of the conduit 106, whereby the cable interconnects with the door handle 102 in a conventional manner, as for example as generally described hereinabove with respect to FIG. 1.

The moisture drainage feature of the condensation drain 110 is provided by the above mentioned drainage opening 114 formed in the bottom B of the condensation drain body 110a which fluidically communicates with the cable passageway 110b (and, therefore, also with the cable passage 106a), wherein the drainage opening is disposed at the gravitationally lowest location of the cable assembly 100, as indicated by plane G in FIG. 2. Accordingly, gravity will naturally pull any moisture (i.e., condensate), M, downwardly in the space S within the conduit between the cable and conduit toward the drainage opening so as to exit thereout to the external environment. Preferably, the drainage opening 114 is in the form of an elongated drainage slot 114a, as is shown best at FIG. 5.

It will be seen at FIG. 4 that for purposes of molding tooling the width W of the drainage opening 114, 114a exceeds the diameter D of the cable 108, however, the cable is operatively retained in the cable passageway 110b because it is kept under tension, and thereby biased away from the drainage opening. However, in the event that the cable is also to be used under compression, then either the width of the drainage opening may be made smaller than the diameter of the cable, or an abutment may be provided (see FIG. 4A discussed hereinbelow).

Turning attention now to FIGS. 6 through 8, a second form of the cable assembly 100' is depicted, wherein now the condensation drain 110' is configured so as to be located anywhere along the cable assembly; that is, anywhere between the first and second conduit connectors (as for example the conduit connectors 16a, 16b respectively connecting to first and second devices (i.e., a door latch 14 and a latch mechanism 12), as shown at FIG. 1), wherein the cable 108 passes through the condensation drain via a cable passageway 110b' formed therein (as for example connecting to cable connectors 18a, 18b at the respective first and second devices as shown at FIG. 1). Thus, it is understood that the conduit 106' is interrupted at the condensation drain 110', but the cable 108 is continuous therethrough. The cable passage 106a' of the conduit 106' (see FIG. 6A) communicates with the cable passageway 110b'.

The cable assembly 100' is generally as described hereinabove, being composed of a conduit (or sheath) 106' which receives therein a cable (or core) 108, both, as previously mentioned, being capable of acting in tension and in compression. Alluding to the prior example of operation, when a door handle is pulled, the cable slides in relation to the conduit which effects actuation of a latch mechanism, whereby the door is unlocked and unlatched in sequence. The condensation drain 110' is interfaced with the conduit 106' at third and fourth conduit connectors 106b', 106c' whereat ends of the conduit are respectively anchored to respectively opposing sides of the condensation drain body 110a', as for non-limiting example by interference fit, adhesive or sonic weld.

The condensation drain body 110a' has a top T' and an oppositely disposed bottom B', wherein the moisture drainage feature of the condensation drain 110' is a drainage opening 114' formed at the bottom of the condensation drain body 110a' which fluidically communicates with the cable passageway 10b' (and, therefore, also with the cable passage 106a' of the conduit 106'). The drainage opening 114' is disposed at the gravitationally lowest location of the cable assembly 100', as indicated by plane G' of FIG. 6. Accordingly, gravity will naturally pull any moisture (i.e., condensate) M to run downwardly in the space S' between the cable 108 and the conduit 106' toward the drainage opening and exit thereout to the external environment. Preferably, the drainage opening 114' is in the form of an elongated drainage slot 114a'.

It will be seen at FIG. 8, in the sense discussed hereinabove with respect to FIG. 4, that for purposes of molding tooling the width of the drainage opening 114' (or drainage slot 114a') exceeds the diameter of the cable 108, however, the cable is retained in the cable passageway 110b' because it is kept under tension, and thereby biased away from the drainage opening. However, in the event that the cable is also to be used under compression, then either the width of the drainage opening may be made smaller than the diameter of the cable, or an abutment may be provided, as for example shown at FIG. 8 in the form of a drip initiator 116.

An optional drip initiator 116 is shown in FIGS. 7 and 8 located at the bottom B' of the condensation drain body 110' adjoining the drainage opening 114' (or drainage slot 114a'). The drip initiator 116 is preferably in the form of a lip 116a spanning the drainage opening on either side of the lip, wherein an upstanding cut-out 116b is formed of the conduit in generally normal relation to the drainage opening and generally co-terminal with the lip. The drip initiator 116 provides a feature at which drop formation is encouraged with respect to the exiting moisture, whereby the drops MD drip therefrom. The lip 116a of drip initiator 116 may further serve, as mentioned above, as an abutment to assist retention of the cable within the cable passageway 110b'.

In this regard, for the moment returning to the first form of the cable assembly 100, FIG. 4A depicts a modification of FIG. 4 which now includes a drip initiator 116' formed in the bottom B" of the conduit body 110a" of the conduit 110" and adjoining the drainage opening 114" (or drainage slot 114a") in the manner as generally described with respect to FIG. 8, having a lip 116a' and a co-terminal upstanding cut-out 116b'. The drip initiator 116' provides a feature at which drop formation is encouraged with respect to the exiting moisture, whereby the drops $M_D$ drip therefrom. The lip 116a' of drip initiator 116' may further serve, as mentioned above, as an abutment to assist retention of the cable 108 within the cable passageway 110b".

Optionally, the condensation drain body 110a' is affixed to an article, as for example a door at its trim or interior panels, via for example, a snap fit interface therebetween snap features 118 located on a projection member 110c integral to the condensation drain body. This affixment ensures that the drainage opening 114' of the condensation drain 110' will remain at the gravitationally lowest location of the cable assembly 100'.

In operation, the cable assembly 100, 100' with condensation drain 110, 110', 110" is connected between selected devices, as for example a latch mechanism and a door handle, wherein the drainage opening 114, 114', 114" of the condensation drain is disposed at a gravitationally lowest location of the cable assembly. Should any moisture get into the cable passage 106a of the conduit 106, 106', as for example by condensation or otherwise, this moisture will be gravitationally pulled to the drainage opening where it will exit the conduit of the cable assembly.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A cable assembly conduit condensation drain, comprising:
   a cable assembly comprising:
      a conduit having a cable passage formed therewithin;
      a cable disposed in said cable passage; and
      a condensation drain comprising:
         a condensation drain body having a top and a bottom oppositely disposed in relation to said top, said condensation drain body having formed therewithin a cable passageway and a drainage opening formed therein at said bottom which fluidically communicates with said cable passageway;
         at least one conduit connector connecting at least one end of said conduit to said condensation drain body, wherein said cable passes through said cable passageway, and wherein said cable passage communicates with said cable passageway; and
         a drip initiator disposed at said drainage opening, said drip initiator comprising:
            a lip disposed at said bottom adjoining said drainage opening; and
            a cut-out formed in said conduit which both adjoins and communicates directly with said drainage opening;
            wherein said lip and said cut-out are configured relative to said drainage opening to facilitate drop formation of moisture exiting from said conduit;
         wherein moisture located in said cable passage is able to gravitationally exit said cable passage through said drainage opening.

2. The cable assembly conduit condensation drain of claim 1, wherein said drainage opening comprises an elongated slot.

3. The cable assembly conduit condensation drain of claim 2, wherein said lip provides an abutment to said cable to prevent said cable from exiting said cable passageway at said elongated slot.

4. The cable assembly conduit condensation drain of claim 3, further comprising a single conduit connector connecting said conduit to said condensation drain body.

5. The cable assembly conduit condensation drain of claim 1, further comprising first and second conduit connectors connecting said conduit to opposing sides of said condensation drain body.

6. The cable assembly conduit condensation drain of claim 5, further comprising snap features connected to said condensation drain body for affixing said condensation drain body to an article.

7. The cable assembly conduit condensation drain of claim 6, wherein said drainage opening comprises an elongated slot.

8. A cable assembly conduit condensation drain for actuating first and second devices mutually spaced from each other, comprising:
   a first device;
   a second device spaced from said first device; and
   a cable assembly connecting to each of said first and second devices, comprising:
      a conduit having a cable passage formed therewithin;
      a cable disposed in said cable passage;
      a condensation drain comprising:
         a condensation drain body having a top and a bottom oppositely disposed in relation to said top, said condensation drain body having formed therewithin a cable passageway and a drainage opening formed therein which fluidically communicates with said cable passageway;
         a first conduit connector connecting a first end of said conduit to said condensation drain body, wherein said cable passage communicates with said cable passageway;
         a connector member connecting said condensation drain body to one of said first and second devices; and
         a drip initiator disposed at said drainage opening, said drip initiator comprising:
            a lip disposed at said bottom adjoining said drainage opening; and
            a cut-out formed in said conduit which both adjoins and communicates directly with said drainage opening;
            wherein said lip and said cut-out are configured relative to said drainage opening to facilitate drop formation of moisture exiting from said conduit; and
         a second conduit connector connecting a second end of said conduit to the other of said first and second devices;

wherein said cable passes through said cable passageway and said cable passage, and wherein said cable connects to said first and second devices;

wherein said drainage opening is disposed at a gravitationally lowest location of said cable assembly such that moisture located in said cable passage gravitationally migrates to said drainage opening whereat the moisture exits said conduit through said drainage opening.

9. The cable assembly conduit condensation drain of claim 8, wherein said drainage opening comprises an elongated slot.

10. The cable assembly conduit condensation drain of claim 9, wherein said lip provides an abutment to said cable to prevent said cable from exiting said cable passageway at said elongated slot.

11. A cable assembly conduit condensation drain for actuating first and second devices mutually spaced from each other, comprising:

a first device;

a second device spaced from said first device; and a cable assembly connecting to each of said first and second devices, comprising:

a conduit having a cable passage formed therewithin;

a cable disposed in said cable passage;

a condensation drain comprising:

a condensation drain body having a top and a bottom oppositely disposed in relation to said top, said condensation drain body having formed therewithin a cable passageway and a drainage opening formed therein which fluidically communicates with said cable passageway;

a first conduit connector connecting said conduit to one side of said condensation drain body;

a drip initiator disposed at said drainage opening, said drip initiator comprising:

a lip disposed at said bottom adjoining said drainage opening; and a cut-out formed in said conduit which both adjoins and communicates directly with said drainage opening;

wherein said lip and said cut-out are configured relative to said drainage opening to facilitate drop formation of moisture exiting from said conduit; and a second conduit connector connecting said conduit to the opposite side of said condensation drain body;

wherein said cable passage communicates with said cable passageway;

a third conduit connector connecting a first end of said conduit to said first device; and a fourth conduit connector connecting a second end of said conduit to said second device;

wherein said cable passes through said cable passageway and said cable passage, and wherein said cable connects to said first and second devices;

wherein said drainage opening is disposed at a gravitationally lowest location of said cable assembly such that moisture located in said cable passage gravitationally migrates to said drainage opening whereat the moisture exits said conduit through said drainage opening.

12. The cable assembly conduit condensation drain of claim 11, wherein said drainage opening comprises an elongated slot.

13. The cable assembly conduit condensation drain of claim 11, further comprising snap features connected to said condensation drain body for affixing said condensation drain body to an article.

14. The cable assembly conduit condensation drain of claim 13, wherein said drainage opening comprises an elongated slot.

15. The cable assembly conduit condensation drain of claim 12, wherein said lip provides an abutment to said cable to prevent said cable from exiting said cable passageway at said elongated slot.

* * * * *

UNITED STATES PATENT AND TRADEMARK OFFICE
CERTIFICATE OF CORRECTION

PATENT NO.        : 7,597,026 B2
APPLICATION NO.   : 11/946907
DATED             : October 6, 2009
INVENTOR(S)       : Smith et al.

It is certified that error appears in the above-identified patent and that said Letters Patent is hereby corrected as shown below:

In the Specification

Column 4, line 62, "conduit" is replaced by --condensation drain body--.

Column 4, line 66, "MD" is replaced by --$M_D$--.

In the Claims

Claim 1, at Column 5, line 65, "conduit" is replaced by --condensation drain body--.

Claim 8, at Column 6, line 58, "conduit" is replaced by --condensation drain body--.

Signed and Sealed this
Twenty-fifth Day of March, 2014

Michelle K. Lee
*Deputy Director of the United States Patent and Trademark Office*